Patented Apr. 1, 1930

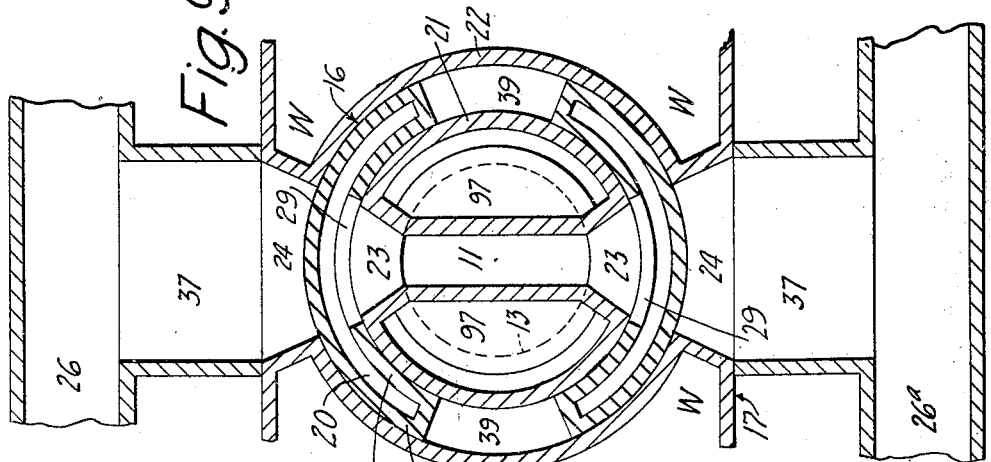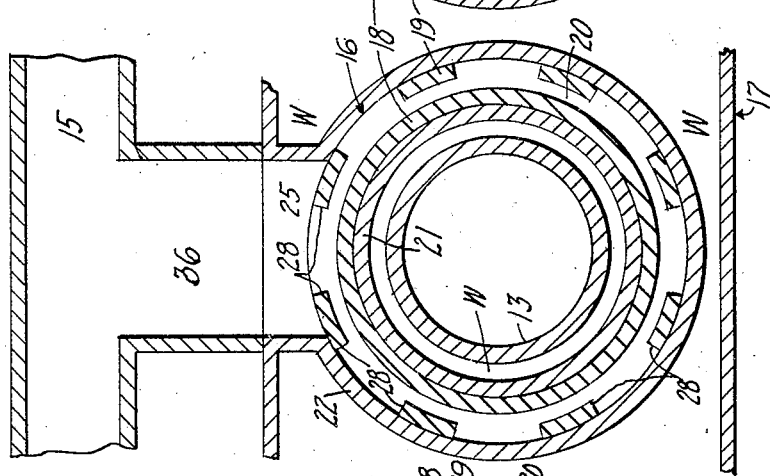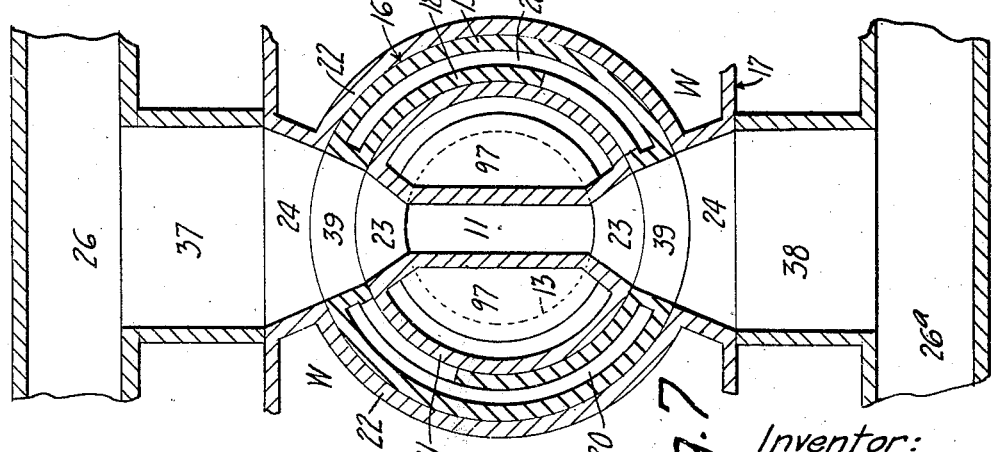

1,753,159

UNITED STATES PATENT OFFICE

BURNHAM C. STICKNEY, OF HILLSIDE, NEW JERSEY

INTERNAL-COMBUSTION ENGINE

Application filed October 23, 1926. Serial No. 143,530.

This invention relates to gas engines, and among its objects are to increase speed, reduce or eliminate vibration, secure compactness, secure flexibility, and economize fuel.

The general organization preferably includes a set of pistons comprising pairs of pistons, the pistons of each pair being in line and moving oppositely to each other and thereby balanced. Between these pistons and the crank-shaft of the engine are mounted levers, preferably of the first order, each lever fulcrumed between its ends and connected at one end to its piston, and at the other end to the crank-shaft by means of a pitman. The levers, being connected to the piston, are also oppositely moving and balanced, and the same is true of the pitmen, so that perfect opposition and balancing of all moving elements is secured throughout the train of mechanism, thereby and in this manner reducing or eliminating vibration, and making possible high speed and fuel economy. The engine is capable of being constructed so that its center of gravity does not shift while the engine is running. The use of the levers permits compact assembling of the cylinders, which may horizontally overlie the crank-shaft; while the pitmen, when at their extreme outward positions, need not and do not extend beyond the room required by the overlying cylinders. The compact arrangement of the cylinders and moving elements thus effected also conduces to lightness. While the pistons are moving outwardly, the pitmen are moving inwardly, thus conducing further to the general balance, in addition to the balancing of each piston by the other and each pitman by the other. The levers being of the first order, one arm of each tends to balance its other arm. Since the pitmen in each pair are operated upon crank-pins, which are diametrically opposite, an advantage is secured by causing the pistons in each pair to have simultaneous explosion strokes, thereby affording a great relief to the crank-shaft bearings, since the thrust upon one crank-pin is exactly balanced by the opposite thrust upon the other crank-pin. This also tends to smooth running.

A further advantage is secured by the use of means between the pistons and the crank-pins whereby the leverage of the pistons upon the crank-shaft may be varied at will, so that, while the lengths of the cranks remain constant, the length of stroke of the pistons may be adjusted or varied. For example, by adjusting the levers bodily upwards and thereby changing the position of their fulcrum on each side of the engine, the length of piston-stroke may be cut down to say two inches; while, by lowering the levers bodily, the length of piston-stroke may be increased to say five or six inches. Raising the levers shortens the upper arms and lengthens the lower arms thereof. Lowering the levers, lengthens the upper arms and shortens the lower arms thereof, thereby increasing the leverage of the pistons upon the crank on the shaft of the engine. When the pistons are making their shortest strokes, the speed of the engine may be very high, and, as will be seen, the output of power may be the maximum that may be derived from the quantity of fuel used. The short stroke is used when but little work is required from the engine, for example, in keeping an automobile in motion at a speed of around thirty miles per hour on level ground. While doing this light class of work, the engine can run with a wide-open throttle and highest compression, thereby using the fuel economically, while not delivering more power than is required, the power being cut down by the aforesaid shortening of the piston-strokes. Heretofore the power has been reduced only by closing the throttle, and, in this case, with the engine necessarily running at high speed, the quantity of fuel admitted to the engine-cylinders is reduced below the full capacity of the cylinder, so that only a low rate of compression is secured, and the gas is used wastefully.

According to this invention, the desired low but efficiently derived output of power may be secured by shortening the piston-strokes to limit the intake of fuel, thus securing high compression and using the gas economically. When ever it is desired to increase the output of power delivered by the crank-shaft, the leverage may be changed, and the piston-strokes may be increased to say five or six inches, to thereby increase the leverage of the piston relatively to the crank-shaft, so that, although the engine may be moving at a high or low speed, this being dependent upon the throttle, it is very powerful. Thus great flexibility is secured, enabling an automobile to be put into motion readily, and quickly brought up to a high speed of travel, and then maintaining said speed at low cost for gasoline.

It will be understood that with maximum piston-strokes the engine may attain, due to increased power, a speed that may necessitate the use of a forced fuel-feed if gas is to be used economically. In ordinary use, however, the engine will seldom be driven at its maximum speed with maximum piston-strokes. The engine may be therefore used when the crank-shaft revolves at a speed, say of six or seven thousand revolutions per minute, for racing purposes or for operating satisfactorily for touring or other uses at moderate speed.

In shifting the levers, the capacities of the explosion chambers are automatically reduced or increased according to the extent to which the leverage is fixed, so that the engine is run with economy at any leverage desired. The control of the automobile would therefore depend partly upon the leverage-changing mechanism, and partly upon the usual accelerator or throttle. By these means the power of the engine may be varied from that derived from a maximum length piston-stroke with wide-open throttle and the maximum leverage upon the crank-shaft to the power derived from a minimum length piston-stroke with nearly closed throttle, thus enormously increasing the flexibility of the engine beyond the usual range. The engine is provided with the use of a clutch to release the engine from the car or other mechanism which it drives, when adjusting the leverage between the pistons and the crank-shaft.

Preferably, there are employed four levers and four pitmen at each side of the engine and its crank-shaft, making eight levers and eight pitmen, and there are preferably sixteen pistons, eight on each side of the engine, each of said levers being directly connected to two pistons, the latter side by side, but each working in a separate cylinder. There being eight pairs of pistons, and each piston of a pair working simultaneously with the other piston of said pair, it results that there are four separate power-impulses to each revolution of the engine-crank-shaft, each impulse being double, the impulse being applied at opposite sides of the crank-shafts simultaneously. The cranks are placed in such timing that the impulses are evenly spaced, four double impulses to each revolution.

Preferably, the two pistons in each pair have a common explosion chamber and a common valving, the explosion chamber being between the co-linear cylinders in which the pistons work; and also a common spark-plug. The valving is preferably in the form of a rotary barrel valve surrounding the water-jacketing of each cylinder and fitted thereon, and having exhaust and inlet ports that may register with ports in opposite sides of said common explosion chamber. The ports are opposed, as will be shown, for the purpose of balancing the pressure upon the valves. The outer part of each valve works in a chest, which is also water-jacketed. Each valve is preferably hollow-walled, and has near one end circumferential openings, which communicate with the manifold which supplies the charging mixture to the hollow of the valve-wall, the interior wall of the valve being ported to admit gas to the cylinders via the ports in the explosion chamber. The valve makes one revolution to two revolutions of the crank-shaft, and the ports in the valve are disposed and are keyed relatively to the ports in the explosion chamber, so that exhaust or intake takes place only once in each revolution of the valve, notwithstanding the opposed relation of the ports. The spark-plug for the explosion chamber is mounted just beyond the end of the valve. Each valve is rotated by means of a gear formed thereon, which meshes with a helical pinion mounted upon a shaft which extends transversely of the valves, and carries a similar pinion for every valve.

Adjustment of the system of levers up and down may be effected by means of arms on two swinging frames, one frame carrying on the ends of said arms a common fulcrum-rod for a set of four levers on one side of the engine, and the other frame carrying in the same manner the opposite set of levers at the other side of the engine. These arms may be swung about their fulcrums by any suitable means, as, for example, by means of a shaft having worms meshing with worm-segments on the hub-portions of said frames to adjust all of the levers simultaneously. Said worm-shaft may be operated by a pinion and rack, the latter being connected to a hand-wheel or lever in position accessible to the operator of the car.

Other features and advantages will hereinafter appear.

In the accompanying drawings,

Figure 1 is a transverse sectional view of an internal combustion engine, showing how the invention may be applied. Two oppositely-working pistons are shown at the middle of their exhaust strokes. In this view the positions of the levers forming part of the means for connecting the pistons and crank-shaft are shown to be adjusted for a piston-stroke equal to the whole throw of a crank-pin.

Figure 4:
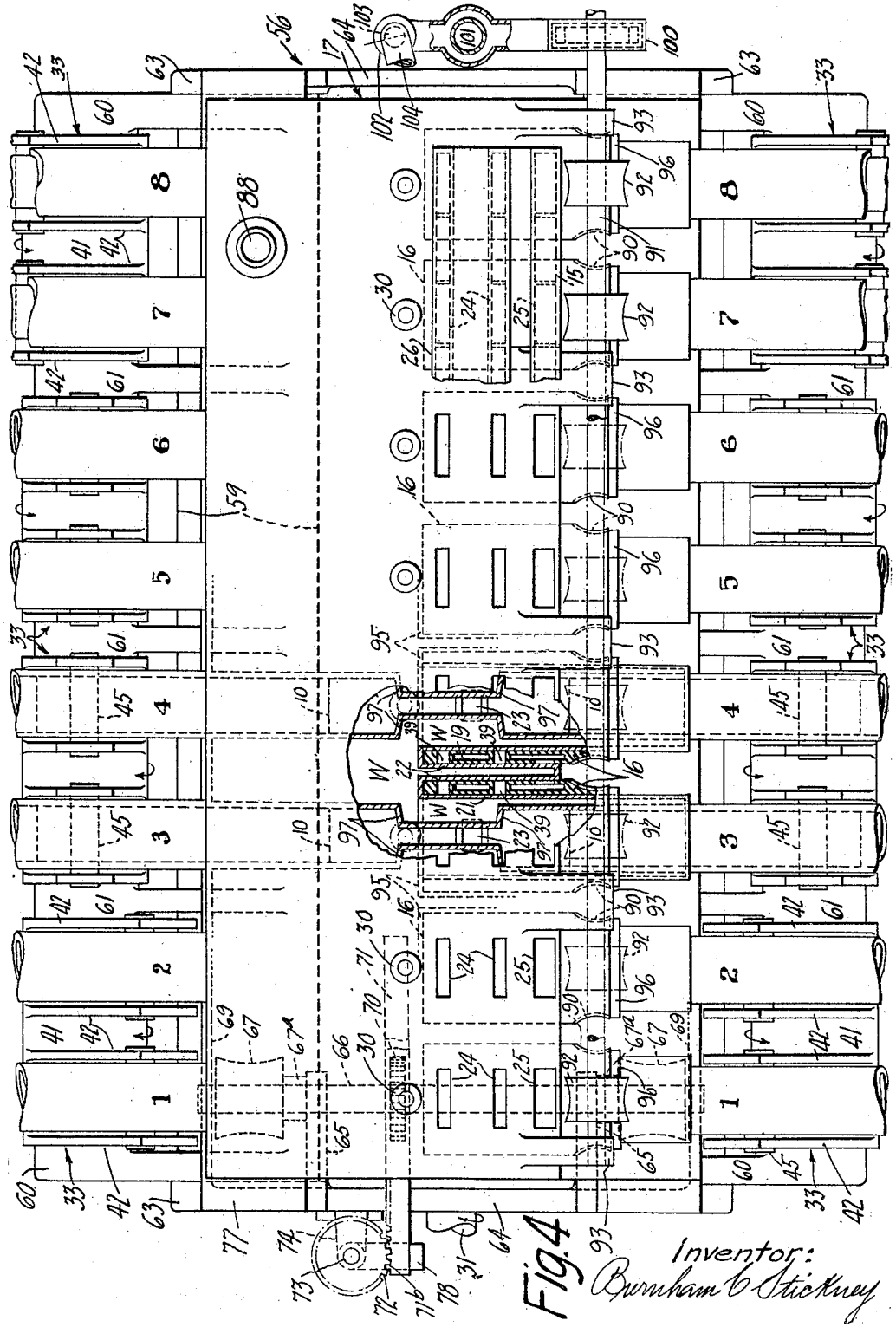

Figure 4 is a top plan-view of the engine, showing the arrangement of the cylinders and the levers that coact with the pistons therein. The cylinders are indicated as being formed in a common cylinder-block. A portion of the block is shown broken away to show in further detail some of the cylinder and valve features. Means for a forced fuel-feeding are also indicated. Manifold openings in the top and bottom of the cylinder-block are indicated, and portions of the intake manifold and upper exhaust manifold are shown. Many of the details of the engine have been omitted from this view for the sake of clearness.

Figure 5:
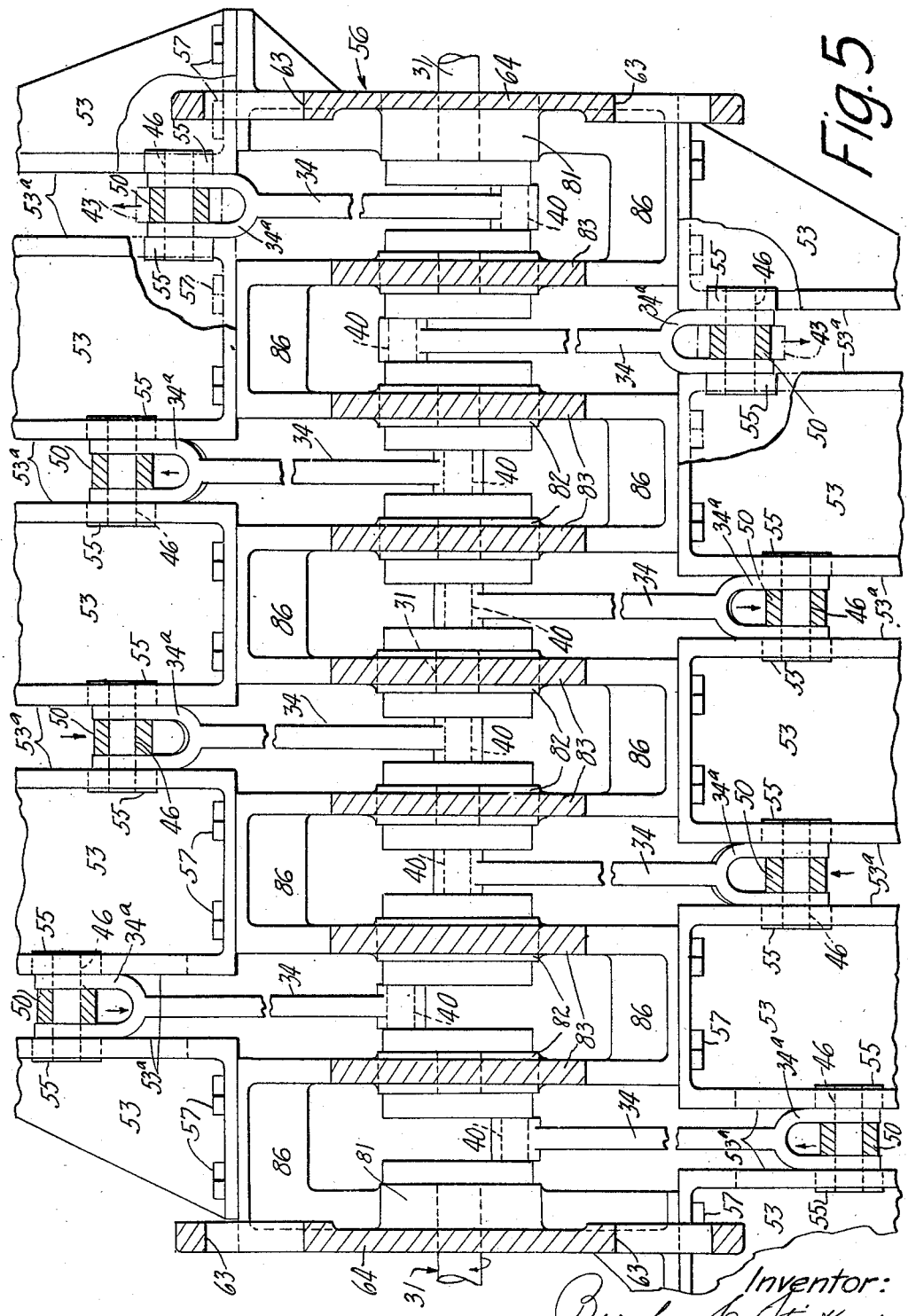

Figure 5 is a top plan-view of the lower portion of a frame for the engine, and shows how bearings for the crank-shaft may be included in said frame. This view also shows cross-head slides for the pitmen secured to said frame. That portion of the frame which includes the bearings for the swingable frames, by means of which the piston-levers are shifted, is also included in this view.

Figure 6:
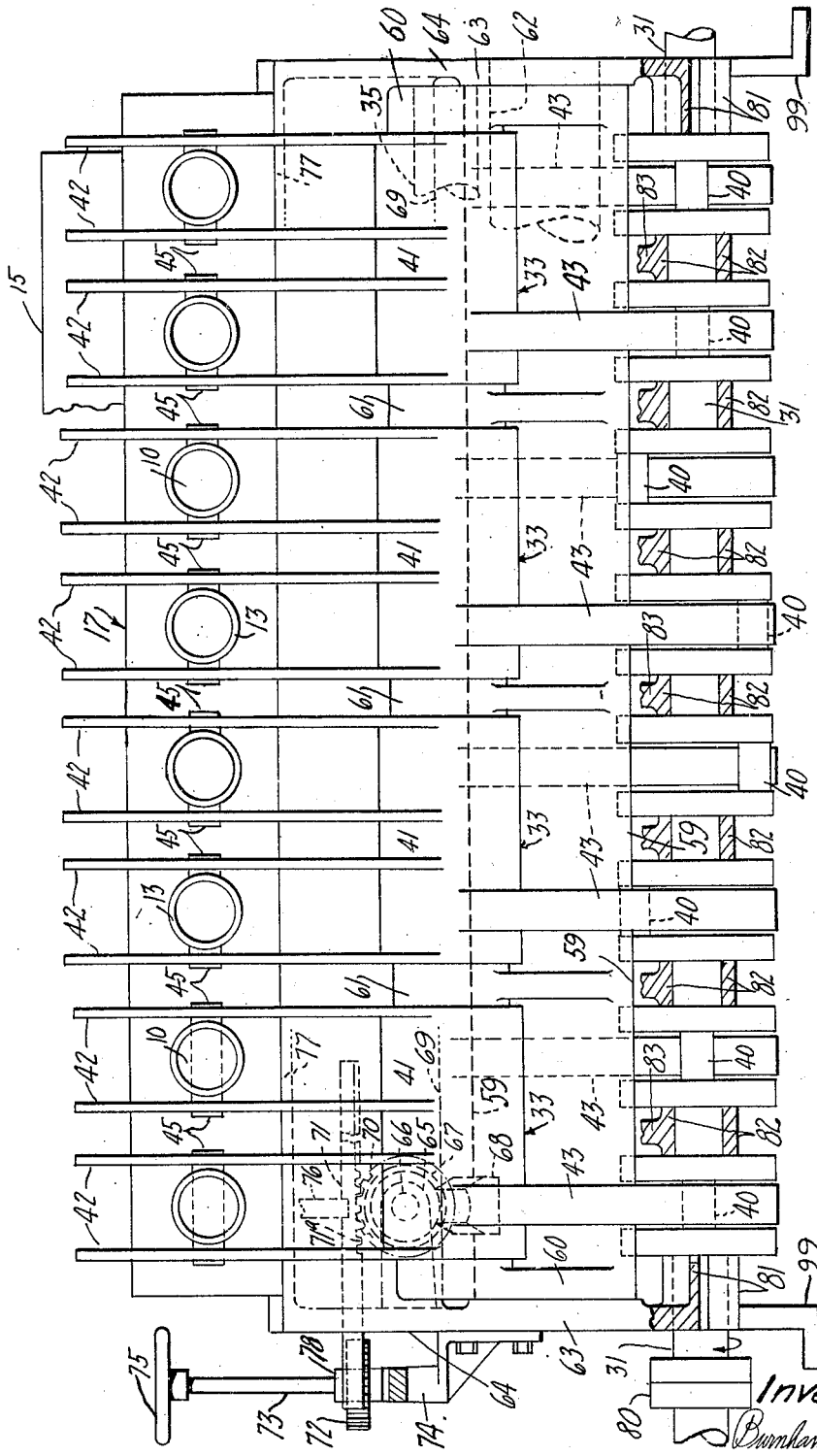

Figure 6 is a side elevation, showing parts of the engine to illustrate the construction and arrangement of the levers for the pistons. This view shows particularly how two pistons are connected to each lever, and shows the staggered arrangement of the lower arms of the levers, so that said arms shall align with their respective crank-shafts. The means whereby said levers may be shifted are also included in this view.

Figures 7, 8 and 9 are views of sections taken transversely of the axis of a cylinder and valve. Figure 7 is a section showing how the exhaust ports of the valve afford passages from the cylinders into the exhaust manifolds. Figure 8 is a section showing circumferentially-spaced ports of the valve for admitting fuel from the intake manifold to the hollow wall of the valve. Figure 9 is a section showing the valve in the position in which intake ports in the inner wall of the valve admit fuel from the hollow wall of the cylinder to the cylinder ports.

Figure 1:
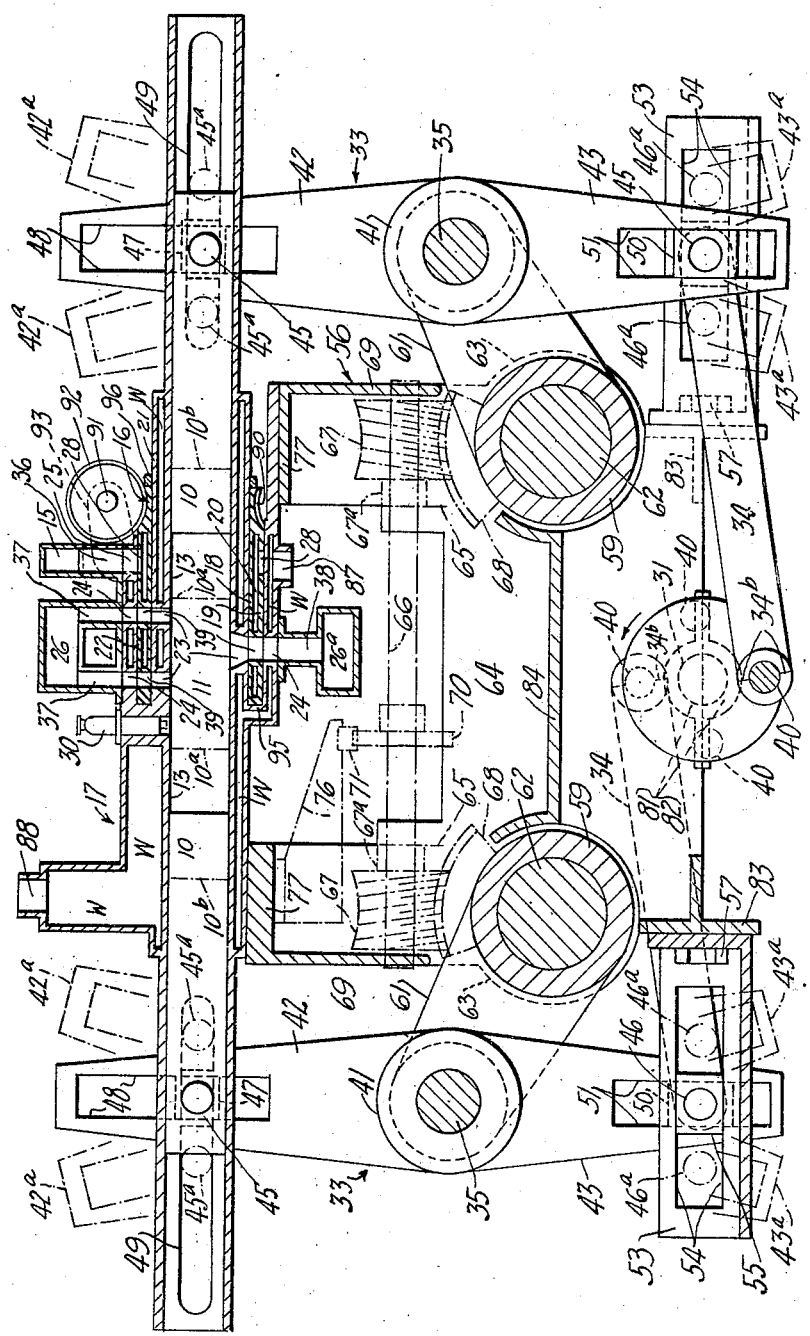

As shown in Figure 1, the invention provides for an internal combustion engine in which pistons 10 operate in pairs. In accordance with the purposes of the invention, the pistons of each pair have co-linear movements in opposite directions to and from an explosion chamber 11, which is between and is common to two opposite and co-linear cylinders 13 in which the pistons move.

Fuel is admitted into each pair of co-linear cylinders from an intake manifold 15 by means of a rotary barrel valve of the type shown in my co-pending application, Serial No. 110,340, filed May 20, 1926. Said valve, generally indicated by the number 16, controls the period of intake of the fuel charge, and also controls the period during which an exploded charge is expelled from the cylinders. There is one of said valves for each pair of co-linear cylinders. In the engine herein shown there are eight pairs of co-linear cylinders for eight pairs of pistons, making sixteen pistons in all. It will be understood that the invention is not limited to this particular number of cylinders, which may be as few as eight pairs, the equivalent of the usual four-cylinder engine, or may be increased to as many as desired.

The cylinders are formed in a common cylinder-block, generally indicated by the number 17. The cylinder-block is formed to include water-spaces W for cooling the cylinders and valves.

It is a feature of the invention that the barrel valves revolve about the axes of their respective cylinders, thereby conducing to compactness of arrangement of said valves and cylinders. Each valve is a cylindrical shell including an inner wall 18, see Figure 2, separated from an outer wall 19 by an annular space 20 closed at each end but having certain port openings in each wall of the shell. By means of said ports gas may pass by way of said annular space from the intake manifold at one end of the valve to the cylinder. The gas as it passes through said annular space also serves to cool the valve. Each valve closely fits and rotates in an annular recess which is concentric with its cylinder and is formed by an inner jacket 21 and an outer jacket 22. The inner jacket 21 is separated from the cylinder by a waterspace W for the purpose of shielding the valve from the heat in said cylinder. To further aid in keeping the valve cool, the outer jacket 22 of the recess in which the valve rotates is also surrounded and cooled by other water-spaces W. Said annular recess has in its inner circumference three valve-controlled cylinder ports 23, and three exhaust manifold ports 24 and an intake manifold port 25 in its outer circumference. Two of the ports 24 of each valve recess open into an upper exhaust manifold 26, and another port 24 opens into a lower manifold 26ª. The port 25 of each valve recess opens into the intake manifold 15. It is a function of the valve to rotate, and at the usual intervals to open and close passages between the cylinder ports and the exhaust or intake manifolds. The annular space 20 of each valve is always open to the intake manifold 15 by means of a number of circumferentially-spaced openings 28. Instead of separate openings 28, as shown in Figure 8, there may be a continuous circumferential opening. For admitting gas from said annular space 20 to the cylinders, there are in the inner wall 18 of each valve intake ports 29 (Figure 9), which open the cylinder ports 23 during an outward or intake stroke of the pistons. The intake ports 29 may be proportioned so that the cylinder ports 23 are opened and closed according to any desired practice, which is approximately that of opening said ports 23 at the beginning of an intake stroke and closing them at the end of said intake stroke. After the admission of a charge into two co-linear cylinders by simultaneous outward strokes of the pistons therein the succeeding inward strokes of said pistons compress said charge, full compression being attained at the end of the stroke at which time the charge is ignited by means of the usual ignition plug 30.

In the ensuing explosion the pistons are forced outwardly in power strokes which are transmitted to a crankshaft 31 and are applied to opposite crank-pins 40 of said shaft as a couple. For thus transmitting power strokes of the pistons to the crank-shaft, there are provided means which include levers, generally indicated by the number 33, and pitmen 34 ranged on either side of the engine for balancing purposes, as will be shown. All the levers 33 on each side of the engine are pivoted on a common fulcrum-rod 35. Upper arms 42 of the levers engage their respective pistons and lower arms 43 of the levers are connected to the crank-shaft by means of the pitmen 34. In order to change the leverages of the levers 33, so that the lengths of the piston strokes may be varied for different conditions under which the engine is used, it is provided that the fulcrum-rods 35 of the levers may be shifted. The means whereby this shifting is accomplished and the objects and effects obtained thereby will be discussed later. After an exploded charge has moved the pistons of a pair outwardly, the valve 16 for the cylinders of said pistons will have rotated to open passages from said cylinder to the exhaust manifolds 26 and 26ᵃ.

The exhaust manifolds 26 and 26ᵃ extends respectively along the top and bottom of the cylinder-block. The intake manifold 15 also extends along the top of the cylinder-block 17. The upper manifold 26 has openings 37 into the ports 24 of the annular recess in which each valve rotates. Similarly, the lower exhaust manifolds 26ᵃ has openings 38, which register with a lower port 24 of said annular recess. Openings 36 in the intake manifold 15 register with the ports 25. When the exploded charge is to be expelled from the cylinders, passages between the ports 23 and 24 are opened by means of ports 39, which are in the nature of tubes extending through both walls of the rotary valve to separate said ports from the annular space 20 between said walls. Following an explosion stroke of the pistons and during the ensuing inward stroke, the exploded charge is expelled into the exhaust manifolds, said ports 39 of the valve affording passages into said manifolds throughout the explosion strokes of the pistons. When the pistons have reached the end of their exhaust strokes, the valve will have rotated to close the passages into the exhaust manifolds. Immediately thereafter the intake ports 29 of the valve will afford openings into the cylinder for the intake of a fresh fuel charge for a new cycle. The cycles of the engine are the usual four-phase cycles, in which every fourth stroke of a piston is a power stroke.

It will be apparent from an inspection of Figure 1 that the symmetrical arrangement of the moving elements on opposite sides of the engine and its crank-shaft results in substantially eliminating all tendency to objectionable vibration. This is because the tendency of each moving element on either side of the engine to vibrate said engine is exactly counter-balanced and neutralized by the opposing tendency of a similar but oppositely-moving element on the other side of the engine.

It will also be apparent that by having two pistons working oppositely from a common explosion-chamber, there is eliminated the usual cylinder-head, against which an exploded charge heretofore reacted to drive a piston. A further and important advantage of two oppositely-working pistons operating as shown is that any given displacement of gas in the co-linear cylinders is effected at one-half the usual piston-speed, which would otherwise result if only one piston effected said displacement.

Another advantage resulting from the oppositely-working pistons is that the operation of each pair of pistons involves two forces which are derived from or transmitted to opposite crank-pins of the crank-shaft and in opposite directions. One result of this is that the crank-shaft bearings are substantially relieved of the usual pitman thrust, because each pitman thrust upon the bearings from one side of the crank-shaft is substantially counteracted by a counter-thrust of a concurrently-actuated pitman from the other side of the crank-shaft. The power-thrusts of the pitman corresponding to a pair of oppositely-working pistons constitute a couple which, due to its having a smaller crank-shaft bearing reaction, is more efficiently translated into crank-shaft rotation than is the stroke of a single pitman.

Piston-operating cycles take place in recurring sequence with respect to the several pairs of co-linear cylinders. According to the usual practice, one pair of pistons is operated in a power-stroke, while another pair of pistons moving in the same direction, and at the same time, sucks fuel into its cylinders. Similarly, the exhaust stroke of the first pair of pistons is accompanied by a compression stroke of the second pair of pistons. Hence, there are always two pairs of pistons operating in similar directions at the same time. It is a feature of the invention that those pairs of pistons which are operated in similar directions, at the same time, operate in two sidewise adjoining cylinders, so that each two pistons which move in unison in similar directions may operate on and be operated by one lever 33 and one pitman 34. By this arrangement the number of pitmen 34 and crank-pins 40 is only one-half the number of pistons. To enable each lever 33 to serve two pistons simultaneously, each lever is formed as indicated in Figures 4 and 6. As shown in said figures, each lever includes an elongate hub 41 from which two pairs of arms 42 extend upwardly, each pair of arms straddling one end of a cylinder to coact with the piston therein. From the hub 41 of each lever 33, there extends downwardly an arm 43, to which the corresponding end of one of the pitmen 34 is connected. It will be seen in Figure 6 that said arm 43 of each lever 33 is offset from the middle of the hub 41 of said lever. As shown in said Figure 6, said arms 43 of the levers 33 on one side of the engine and its crank-shaft are offset in one direction, to align with their respective crank-pins. Similar arms 43 of the levers 33 on the other side of the engine are offset in the opposite direction, to align with their respective crank-pins.

To regulate the power of the engine by changing the length of the piston-stroke and at the same time making possible an economical use of fuel by a corresponding change in the cubic capacity of the explosion chamber 11, there are provided means for shifting the fulcrum-rods 35 of the levers 33 to cause such changes of the length of piston-stroke and the cubic capacity of the explosion chamber. The extent and range of movement of the point of connection of the lower arm 43 of each lever to the pitman always being constant, it results, if the fulcrum-rods 35 are raised or lowered, that the piston-strokes are correspondingly decreased or increased. If the pistons-strokes are decreased by shifting the fulcrum-rods upwardly a decrease in the capacity of the explosion chamber to accord with the decreased piston-strokes may be effected by also shifting the fulcrum-rods 35 inwardly as well as upwardly. Conversely, if the fulcrum-rods are shifted downwardly to effect an increase in piston-stroke, said fulcrum-rods are at the same time shifted outwardly to increase the cubic capacity of the explosion chamber. It will be apparent that the capacity of the explosion chamber is determined by how near the opposite piston-heads have approached one another at the end of the inward strokes of said pistons.

Figure 3:
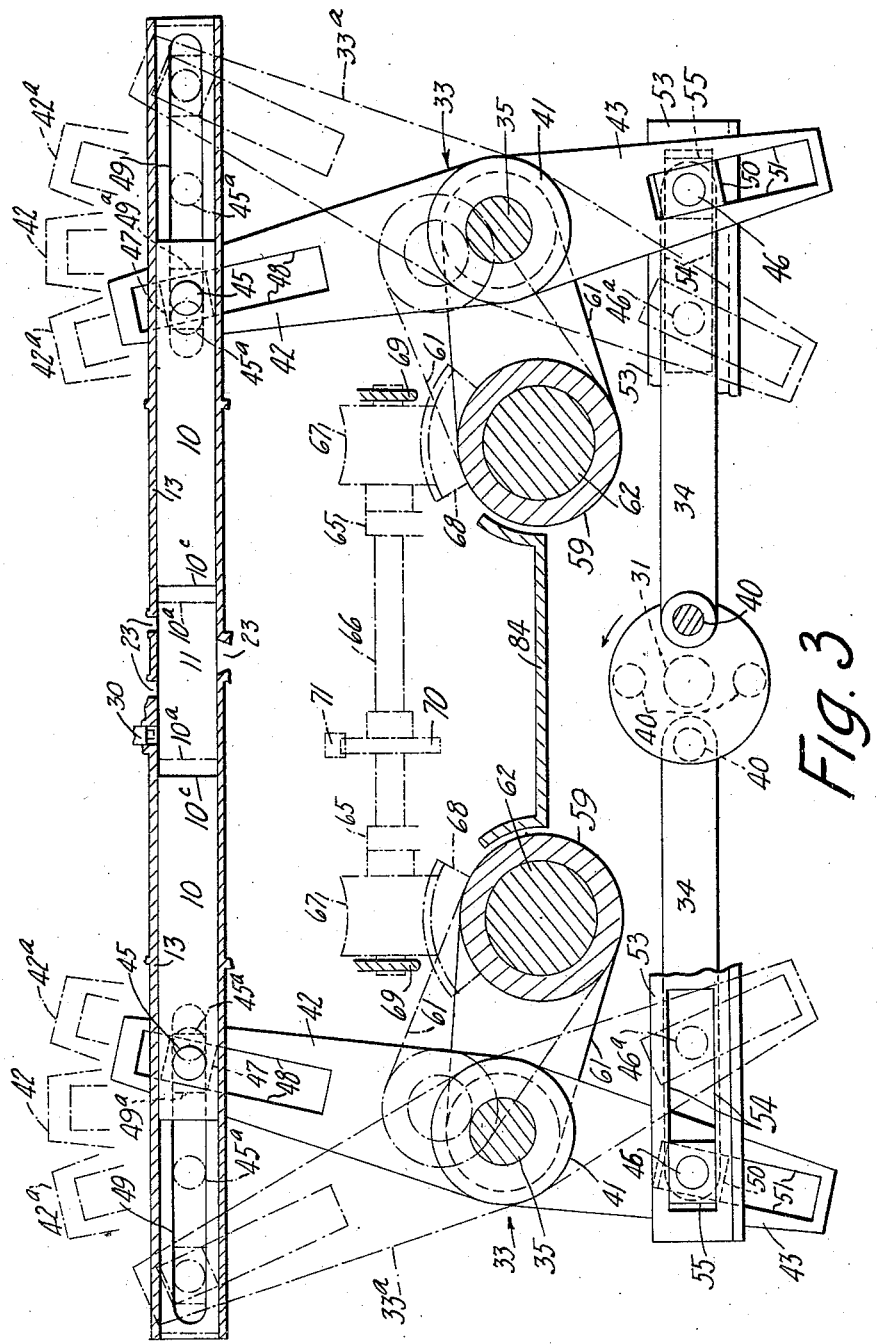
Figure 3 is a view of a transverse section of the engine, including only such parts as are necessary to show the positions of the levers between the pistons and the pitmen adjusted for maximum piston-strokes. In this view the pistons are at the beginning of what may be regarded as either an explosion or an intake stroke.

Figure 1 shows the fulcrum-rods 35 in such position that the extent of piston-stroke is the same as the throw of the crank-pins, and the pistons are shown in the middle of their exhaust-strokes. The positions of the piston-heads at the extremes of the piston-strokes are represented by the broken lines $10^a$ and $10^b$, the longitudinal extent of the explosion chamber being defined in Figure 1 by the space between the lines $10^a$. In Figure 3, the fulcrum-rods are shown in positions for maximum piston-strokes, and the pistons are shown at the ends of their inward strokes with the piston-heads represented by the lines $10^c$. In said Figure 3, lines $10^a$, representing the positions reached by the piston-heads in the shorter strokes, as shown to indicate how the explosion chamber capacity is changed as the piston-stroke is changed. Broken lines $42^a$ and $43^a$ represent the extreme positions reached by the upper and lower arms respectively, in the short strokes illustrated in Figure 1. In Figure 3, when the pistons are at the end of maximum outward strokes, the levers will be in positions $33^a$.

The locations of the extreme positions between which the fulcrum-rods are shifted depend upon the locations of the extremes between which the piston-pins 45 move for maximum and minimum piston-strokes and also upon the corresponding changes in explosion chamber capacity. The piston-pins 45 are part of the means operatively connecting the pistons to the upper arms 42 of the levers 33. In Figure 1 the extremes between which the piston-pins 45 move for the extent of piston-stroke, indicated in said figure, are represented by the dotted circles $45^a$. Means for connecting the lower arm 43 of each lever to its pitman 34 include a cross-head-pin 46 constrained, as will be shown, to have a reciprocating horizontal movement of unchanging reach and extent determined by the length of the pitman 34 and the crank-shaft throw. In Figures 1 and 3, the extreme positions reached by the cross-head pins are represented by the dotted circles $46^a$. In Figure 1, with the levers formed as shown, the center of each fulcrum-rod is at the intersection of lines (not shown) joining the center of each circle $45^a$ to the center of the corresponding circle $46^a$. Similarly, for the maximum piston-stroke illustrated in Figure 3, each fulcrum-rod center is at the intersection of lines joining the centers of corresponding piston and cross-head-pins when said pins are at their extreme positions. As shown in Figure 1, the centers of a fulcrum-rod and associate piston and cross-head-pins lie in a line perpendicular to the line of piston movement when the pistons are at the middle of strokes equal to the crank-shaft throw. It is obvious that in this case the instantaneous length of the upper and lower arms of the levers 33 are equal.

In the illustrated form of the invention each piston-pin 45 has a movement that is relatively endwise of the arms 42 of the lever 33 with which said piston-pin co-operates in the operation of the engine. To accomodate this movement of a piston-pin relatively to the arm with which it is connected there may be provided a block-and-slide connection of the piston-pin to the arm, said connection including a block 47 for each arm 42, said block 47 co-operating with and being retained by slide surfaces 48 of proper extent formed on each arm 42. As there is a pair of arms straddling each piston and its cylinder, it is obvious that there is a block 47 at each end of a piston-pin which projects from opposite sides of the piston. Each cylinder has formed on opposite sides slots 49 within which the piston-pin may move to and fro. Said slots may form slide bearings for the piston-pins which may have sliding blocks 49ª coacting with the slots 49. Each cylinder extends ouwardly far enough beyond the cylinder-block proper, to sufficiently support the piston in said cylinder against the side thrusts which said piston receives in co-operating with the levers 33.

Each pitman-cross-head pin 46 also has a movement that is relatively endwise of the lower arm 43 of the lever with which said cross-head pin co-operates as the engine operates, and there may be provided a block-and-slide connection of the lower arm 43 to cross-head pin 46, said connection including a block 50 for the arm 43, co-acting with slide-surfaces 51 formed in said arm. For guiding the cross-head pins horizontally, there are provided cross-head slide-members 53 having guiding surfaces 54 for guiding blocks 55 surrounding said pins. The cross-head slide-members 53 may be formed, as shown in Figures 1 and 5, and secured to a main frame of the engine by bolts 57. Said main frame is generally indicated by the number 56. As shown in Figure 5, the block 50 for the arm 43 of each lever 33 is in the middle of the cross-head pin and closely fits between the branches of the bifurcated end 34ª of the corresponding pitman. Said bifurcated end of the pitman may be guided laterally by finished sides 53ª of the cross-head slide-members. It will be seen in Figure 5 that there is a block 55 at each end of a cross-head pin, each of said blocks having a sliding fit in corresponding guiding surfaces 54 of a cross-head slide-member.

In order that the fulcrum-rods 35 may be shifted and directed for changing the lengths of the piston-stroke with corresponding changes in explosion chamber capacity, each of said rods may be incorporated in a swingable frame that includes a bar or hub 59 that is of such length that arms 60 at each end of said hub 59 are far enough apart to include all the levers 33 on one side of the engine. Said arms 60 and hub 59 of each swingable frame serve to support and swing the fulcrum-rod to different positions about a suitably chosen axis as shown in Figures 1 and 3. The position of said axis with respect to the fulcrum-rod defines the length of said arms 60 and the extent of sidewise movement of said rod for changing the explosion chamber capacity. Intermediate arms 61 may extend from the hub 59 of each swingable frame to aid in supporting the fulcrum-rod and the levers 33 mounted thereon, and to space and retain said levers in their proper positions along said fulcrum-rod. Each hub 59 with its arms 60 and 61 may swing about a rod 62, which may be supported in bearings 63 in end walls 64 of the main frame 56 of the engine. Said bearings 63 are indicated in Figure 5. It will be understood that in changing the strokes of the pistons the fulcrum-rods 35 are preferably shifted simultaneously and to the same extent, so that the strokes of all the pistons are changed simultaneously and uniformly. Means for moving the swingable frames, in which the fulcrum-rods 35 are incorporated, may include a cross-shaft 66 for connecting said frames and swinging them simultaneously. Said cross-shaft has for this purpose, near each end, a worm 67 which overlies and meshes with a worm-segment 68, which may be part of each hub 59 of the swingable frames. The threads of the worms 67 should closely fit and mesh with the teeth of the segments 68, so that the fulcrum-rods may be rigidly held in any position. The cross-shaft 66 may be journaled in opposite side walls 69 of the main frame 56 and in bearings 65 extending from one end wall 64 of the engine. The sides of the bearings 65 also hold the shaft against end play, said sides abutting the ends of hubs 67ª of the worms 67. The walls 69 may extend between and join the end walls 64 of the main frame, and serve to stiffen said main frame. As shown in Figure 6, the cross-shaft 66 is preferably near one end of the main frame and may be rotated to change the piston stroke, from some convenient external location by suitable means. Said means, as illustrated, include a pinion 70 on said shaft to enable said shaft to be rotated by means of a bar 71 having teeth 71ª meshing with said pinion and extending beyond the main frame, so that said bar may be operated by a second pinion 72 meshing with other teeth 71ᵇ in said bar. Said pinion 72 may be fastened to a shaft 73 rotatable in a bracket 74 fastened to the end wall 64 of the main frame. A hand-wheel 75, suitably located, may rotate said shaft 73 by means of suitable connections. Another bracket 76 (Figures 1 and 6) may be fastened to the under side of one of the upper platforms 77 of the main frame and serve to guide the bar 71. The bracket 74, in which the pinion 72 outside of the main frame is rotatable, may include a portion 78 for supporting and guiding the bar in proper relation to said pinion 72. Turning the hand-wheel 75 causes, by the means just described, the fulcrum-rods 35 to be shifted in a direction depending upon the direction in which the hand-wheel is turned. The threads of the worms 67 must obviously be of opposite hands, as shown in Figure 1. Other means controlled by a simple lever, conveniently located, may be provided to change the piston-strokes, instead of the means herein shown. Suitable means, not shown, may be provided to co-operate with the fulcrum-rod-shifting means to indicate the extent of piston-stroke for which said rods may happen to be adjusted or to indicate the changes in the extent of piston-stroke while said fulcrum-rods are being adjusted. Suitable means, not shown, may also be provided to positively limit the extent to which the fulcrum-rods may be shifted. In order that the fulcrum-rods 35 may be shifted easily, it is preferable that while the rods are being shifted, the engine be disconnected from the car or other mechanism which it drives. The usual engine-clutch generally indicated at 80, Figure 6, may, in this case, serve the purpose of thus disconnecting the engine, by disconnecting the crank-shaft from the external mechanism.

As shown in Figures 5 and 6, the crank-shaft has end bearings 81 in the end walls 64 of the engine-frame, and an intermediate bearing 82 between each two adjacent crank-pins 40. As is usual, the crank-shaft bearings are split, as indicated in Figure 1. The crank-pin bearing of each pitman 34 is also split, the split being conventionally indicated by the line 34ᵇ across said bearings (see Figure 1). The upper halves of the intermediate bearings 82 may be embodied in transverse members 83 of the main frame, which extend downwardly from a channel-shaped longitudinal member 84, Figure 1, of said main frame. Said longitudinal member extends between and is joined to the end walls 64 of the main frame 56. As shown in Figure 5, those sides or ends of the transverse members 83 and the main frame end walls 64, between which no pitman operates, are joined by a T-shaped section 86 having outer faces, against which the aforesaid cross-head slide-members 53 are fastened.

Figure 2:
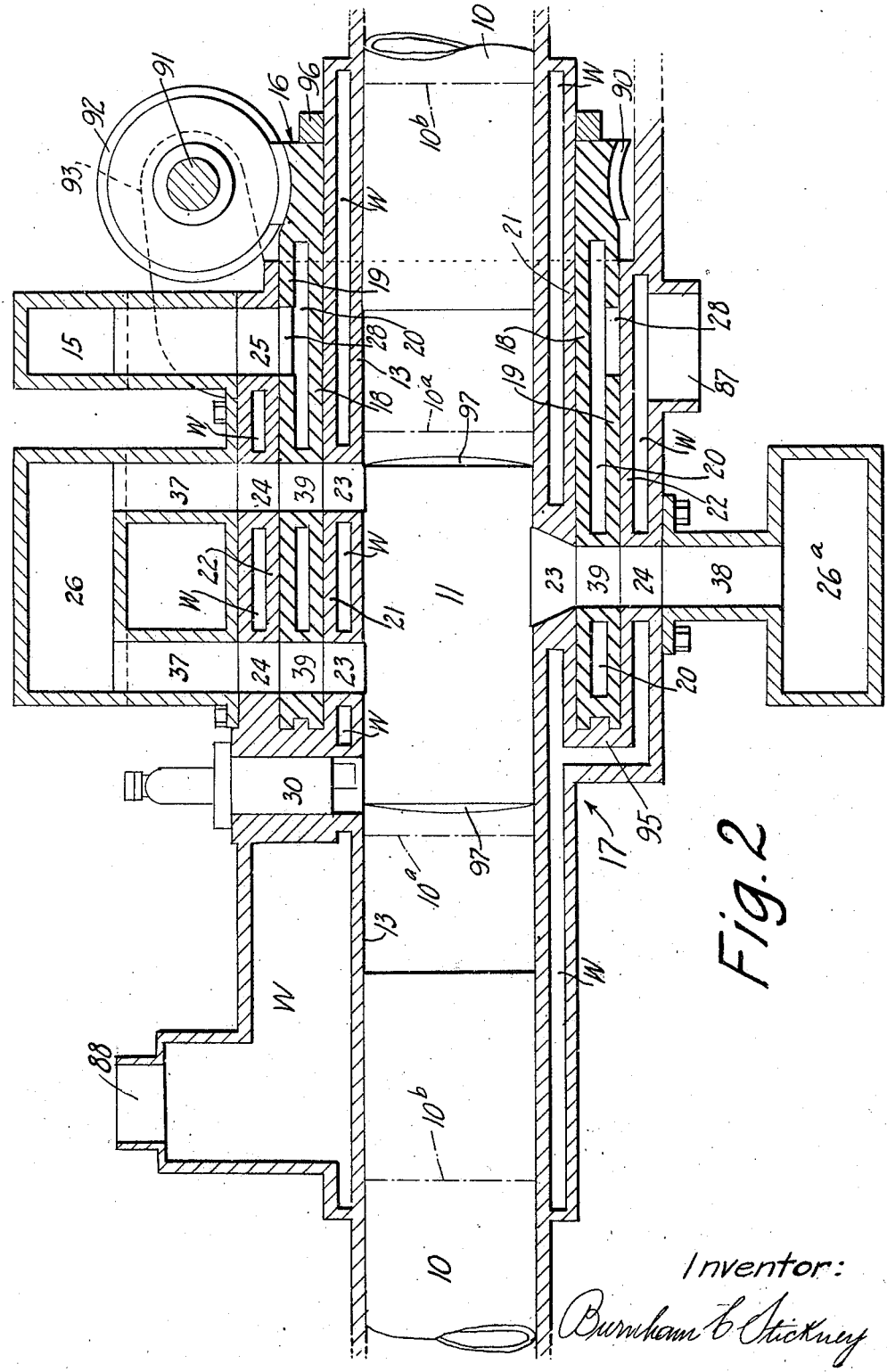
Figure 2 is a view of a section taken longitudinally of one of the cylinders, and shows particularly that portion of two co-linear cylinders which includes the explosion chamber and its surrounding barrel valve. In this view the valve is in the position where it connects the cylinder with the exhaust manifolds.

It will be apparent from Figures 1, 2 and 4 that the cylinder-block 17 may be formed with ample water-spaces W for cooling the engine. As shown in Figure 1, there is a water inlet 87 at the bottom of the cylinder-block. There is only one such inlet, and for convenience of illustration it is shown in Figures 1 and 2 as being directly under the cylinder. It may be preferable to have the inlet between two cylinders. Water, after circulating throughout the engine-block to cool the cylinder and valve mechanism may leave the cylinder-block through an outlet 88 in the top of said cylinder-block. The water may be directed from said outlet to the usual radiator, and thence back to the inlet 87 again. The water may circulate either by convection or by means of the usual pump, not shown.

For rotating the barrel-valves 16 to open and close the cylinder-ports 23 in synchronism with the piston movements, there is formed at the outer end of each valve a gear 90 having helical teeth, so that said valve may be rotated by a shaft 91 extending along the whole bank of valves, said shaft thus serving to rotate all of said valves. There is on said shaft 91 a pinion 92 for every valve, each pinion meshing with the gear 90 formed on its valve. The shaft 91 may be journaled in several brackets 93 extending from the upper surface of the cylinder-block. The annular recesses in which the valves rotate are closed at their inner ends by walls 95, which separate said ends from adjoining water-spaces. The inner ends of the valves, as they rotate, abut said walls 95, the outer ends of each valve abutting a ring 96, which may be removably fastened around the jacket 21 on which the valve rotates. In this manner, each barrel-valve is positioned longitudinally of its cylinder, and, by removing the ring 96 and pinion 92, may be withdrawn from its bearings.

As shown in my aforesaid co-pending application, the cylinder-ports 23 are arranged, as also shown herein, at diametrically opposite sides of the cylinder for the purpose of balancing the pressure upon the valve and effecting a consequent reduction of friction between the valve and its bearings. To this end, the combined areas of the two upper cylinder-ports 23, at the valve surface, are made equal to the area, at the valve surface, of the lower cylinder-port 23. Said upper ports 23 and the corresponding valve-ports are offset from the lower port 23 and corresponding valve-ports, so that none of said ports 23 shall be opened more than once for fuel intake, nor more than once for exhaust in each revolution of the valve. A full-area port is staggered between two opposite half-area ports for the purpose of preventing opposite pressures upon the valve from producing the effect of an unbalanced couple, which otherwise would tend to tilt the valve and produce friction.

With the arrangement herein shown, the explosion chamber must be of sufficient longitudinal extent to include the cylinder-ports 23 and the opening in which the ignition plug 30 is inserted. If the cross-section area and form of the explosion chamber were the same as the area and form of cylinder, the capacity of said chamber would be too large relatively to the piston-displacement, and consequently a proper degree of compression could not be attained. The cylinders are therefore constricted where they form the explosion chambers, as shown most clearly in the sectioned portion of Figure 4. The constricted portion of each cylinder extends lengthwise between offsets 97 in the cylinder walls. As shown in Figures 8 and 9, a cross-section of the explosion chamber is approximately rectangular in form, and of substantially less area than the full-cross-sectional area of the cylinders. It may be noted in Figures 1 and 3 that changes in the capacity of the explosion chambers are effected by changing the longitudinal extent of that small portion of the full cylinder bore that is at each end and is part of the explosion chamber. It will be seen that a relatively small change in said latter extent produces a comparatively large change in the total capacity of the explosion chamber, and thus comparatively little sidewise movement of the fulcrum-rods 35 is required to change the explosion chamber capacity.

The cylinder-block is mounted on the platforms 77 of the engine-frame 56 and is suitably fastened thereto. The engine-frame may be provided with standards 99 indicated in Figure 6. Means for forcing fuel into the cylinders, when the engine is run at high speeds for racing purposes, may include a blower 100, which may, as indicated in Figure 4, be connected to and rotated by the shaft 91, which rotate the valves. Said blower 100 forces air past suitable pre-heating means 101 and into the usual carbureter 102, which is provided with the usual throttle 103 for controlling the amount of fuel that is admitted to the cylinders. By suitable means, not shown, the blower, carbureter and pre-heating means may be supported by the main frame 56. The carbureter has the usual outlet pipe 104, partly shown, which extends toward and is connected to the intake manifold 15.

It will be noted that the engine herein described is capable of affording an unusually large range of power output, the output of power being controlled either by the throttle 103 or by changing the piston-strokes or by a combination of both throttle and piston-stroke changes. With a short stroke of pistons and the engine running at moderate speed, there may be a very small output of power, derived from fuel that is used in the most efficient manner, because with said short piston-stroke and a corresponding adjustment of the explosion chamber the gas may be fully compressed.

As the length of piston-stroke is increased, it is obvious that the leverage between the pistons and crank-shaft is also increased. The increased fuel consumption due to the increased piston-strokes naturally results in increased power, and the transmission of this increased power to the crank-shaft by means of the increased leverage results in enormous power at the crankshaft. If this power is to be used for racing purposes the engine may attain a speed of say six thousand to seven thousand revolutions per minute, and it is for this reason that the means for forced fuel feeding indicated elsewhere may be required. Whatever the stroke of the pistons may be, the power output may, as stated, also be controlled by the throttle. It may be that gas will not be used most economically if, at the option of the operator or under some exigencies of operation, the throttle alone is used for regulating the power of the engine. Under normal operation of the engine at a definite speed, any required power output may be had at said speed by adjusting the stroke of the pistons so that the engine yields said power with a wide-open throttle, full compression, and consequently with the most economical use of fuel.

Four pairs of opposite crank-pins 40 are arranged in quadrature as viewed endwise of the crank-shaft. Longitudinally of the crank-shaft the order of quadrature corresponds to the order in which similar phases of the operating cycles occur throughout eight pairs of cylinders. For eight pairs of co-linear cylinders numbered from one to eight, as shown in Figure 4, and with each crank-pin serving two pistons in the manner already explained, the firing order for the arrangement of the engine shown herein is 1—5—7—3—2—6—8—4.

For equalizing the torsional strains to which the crank-shaft may be subjected there may be adjacent to and on each side of each crank-pin 40 a cylindrical portion 105 forming part of the crank-shaft. Each of said cylindrical portions may be of such dimensions that it has enough mass to serve as a fly-wheel. There being a multiplicity of such fly-wheels distributed along the crank-shaft it results that the individual torsional strains resulting from the periodic stresses imposed upon the several crank-pins are equalized, thus further conducing to the balance and smooth running of the engine.

It will be noted that the fulcrum-rods 35 of the levers 33, as they are shifted, move in a fixed curve due to said rods swinging about an axis. Hence with the particular means herein shown for shifting the fulcrum-rods 35, the changes in explosion chamber capacity may not be strictly proportionate to the changes of piston-stroke except at the extremes of the range of fulcrum-rod movements. At said extremes the proportionate changes of explosion chamber capacity are determinable. The slight deviations from a strictly proportionate explosion chamber capacity, which result as the fulcrum-rods are shifted to positions between said extremes, are of not enough consequence to warrant the use of other means to avoid such deviations. Such deviations, however, may be avoided, if desired, by the employment of appropriate means for shifting the fulcrum-rods, as, for example, the employment of guiding means for constraining the rods to move in such manner that the explosion chamber capacity undergoes a uniformly proportionate change for each change in the length of piston-stroke. It may be desirable to move the fulcrum-rods and change the explosion chamber capacity in such a way that there is a different degree of compression accompanying short piston-strokes than there is for the longer piston-strokes, and suitable means may accordingly be provided, all such means being within the scope of the invention.

Variations may be resorted to within the scope of the invention, and portions of the improvements may be used without others.

Having thus described my invention, I claim:

1. An internal combustion engine including a crank-shaft, a set of pistons overlying the crank-shaft, means including levers for connecting the pistons to the crank-shaft, means for adjusting said levers bodily upwards to shorten the piston-strokes and downwardly to lengthen the piston-strokes.

2. An internal combustion engine including a crank-shaft, a plurality of pairs of pistons, the pistons of each pair working in a cylinder extending transversely of the crank-shaft, each cylinder having midway thereof an explosion chamber, means including a set of levers of the first order on each side of the engine for connecting the pistons on said side to the crank-shaft, swingable arms upon which said sets of levers are fulcrumed, said arms enabling the fulcrums of the levers to be shifted to change the lengths of piston-strokes, a rotatable hub on each side of the engine, connecting all the arms on said side, a shaft extending transversely of said hubs and having worms meshing with worm-segments on said hubs, and means for revolving aid shaft at will.

3. An internal combustion engine including a crank-shaft, a plurality of pairs of pistons, the pistons of each pair working in a cylinder extending transversely of the crank-shaft, each cylinder having midway thereof an explosion chamber, means including a set of levers of the first order on each side of the engine for connecting the pistons on said side to the crank-shaft, swingable arms upon which said sets of levers are fulcrumed, said arms enabling the fulcrums of the levers to be shifted to change the lengths of piston-strokes, a rotatable hub on each side of the engine connecting all the arms on said side, a shaft extending transversely of said hubs and having worms meshing with worm-segments on said hubs, and means including a pinion on said shaft, a rack meshing therewith, and a handle or lever connected to the rack for revolving said shaft at will.

4. An internal combustion engine including a crank-shaft, pitmen therefor, means supporting the outer ends of the pitmen for sliding movements, a set of pistons overlying the crank-shaft and having wrists, means including slotted levers for connecting the piston-wrists to the outer ends of the pitmen, and means for adjusting said levers bodily upwards to shorten the piston-strokes and downwardly to lengthen the piston-strokes.

5. An internal combustion engine including a crank-shaft, pitmen therefor, means supporting the outer ends of the pitmen for sliding movements, a set of pistons overlying the crank-shaft and having wrists, means including slotted levers of the first order for connecting the piston-wrists to the crank-shaft, and swingable arms upon which said levers are pivoted, said arms capable of shifting the levers bodily up and down, thereby to change the length of the piston-strokes.

6. An internal combustion engine including a crank-shaft, pitmen connected thereto, means for slidably supporting the outer end of the pitmen, a plurality of pairs of pistons having wrists, the pistons of each pair working in a cylinder extending transversely of the crank-shaft, each cylinder having midway thereof an explosion chamber, means including a set of levers of the first order radially slotted at top and bottom on each side of the engine for connecting the piston-wrists on said side to the corresponding pitmen, and means for simultaneously shifting all the levers, thereby to change the leverage and length of piston-strokes and effect a corresponding change in explosion-chamber capacity.

7. An internal combustion engine including a crank-shaft, pitmen therefor, sliding supports for the outer ends of the pitmen, a plurality of pairs of pistons, the pistons of each pair working in a cylinder extending transversely of the crank-shaft, each cylinder having midway thereof an explosion chamber, means including a set of levers of the first order on each side of the engine and radially slotted top and bottom for connecting the piston-wrists on said side to the outer ends of pitmen, swingable arms upon which said sets of levers are pivoted, said arms enabling the levers to be shifted bodily to change the lengths of piston-strokes, a rotatable hub on each side of the engine connecting all the arms on said side, and manually-controllable means for simultaneously rotating said hubs to effect a change in the lengths of piston-strokes at will.

8. In an internal combustion engine, the combination of a crank-shaft, sets of pitmen extending oppositely therefrom, sets of levers of the first order extending upwardly from the outer ends of the pitmen, sets of pistons operating said levers, sets of cylinders for said pistons, and means for moving both sets of levers upwardly to decrease the piston-stroke length, and simultaneously diminish the capacity of the explosion chambers in the cylinders.

9. In an internal combustion engine, the combination of a crank-shaft, sets of pitmen extending oppositely therefrom, cross-heads for the outer ends of the pitmen, guides for the cross-heads, sets of levers of the first order extending upwardly from the cross-heads, said levers slotted at their lower ends to engage said cross-heads, sets of pistons having wrists, said levers slotted at their upper ends to engage said wrists, sets of cylinders for said pistons, and up-and-down shiftable means whereon said sets of levers are pivoted for bodily shifting thereof.

10. Engine as set forth in claim 9 in which two pistons are connected to each lever and its pitman.

11. Engine as set forth in claim 9 in which each lever includes arms extending upwardly and downwardly from a rock-shaft, a plurality of arms extending upwardly, and each piston having opposite wrists engaging the upwardly-extending arms; a single arm extending down from said rock-shaft to the cross-head.

12. Engine as set forth in claim 9 in which two pairs of lever-arms extend upwardly in a row and a single arm extends downwardly from a rock-shaft, each pair of upwardly-extending arms engaging wrists upon opposite sides of the corresponding piston.

13. Engine as set forth in claim 9 in which lever-arms extending upwardly from a rock-shaft embrace each cylinder, each piston having opposite wrists engaging slots in said arms, each cylinder being longitudinally slotted to form raceways for the wrists.

BURNHAM C. STICKNEY.